United States Patent

[11] 3,565,201

| [72] | Inventor | Robert E. Petsinger |
| | | Upper St. Clair, Pa. |
| [21] | Appl. No. | 797,633 |
| [22] | Filed | Feb. 7, 1969 |
| [45] | Patented | Feb. 23, 1971 |
| [73] | Assignee | LNG Services |
| | | Pittsburgh, Pa. |

[54] CRYOGENIC FUEL SYSTEM FOR LAND VEHICLE POWER PLANT
4 Claims, 4 Drawing Figs.

[52] U.S. Cl. .................................... 180/54;
62/52, 123/122, 261/16
[51] Int. Cl. ........................................ B60k 15/02
[50] Field of Search .......................... 180/54, 1;
261/16; 48/(Cursory); 62/52, 51; 123/120, 122
(E)

[56] References Cited
UNITED STATES PATENTS

| 1,196,643 | 8/1916 | Bedford et al. | 180/54 |
| 2,636,814 | 4/1953 | Armstrong et al. | 261/16X |
| 2,645,906 | 7/1953 | Ryan | 123/121X |
| 2,701,133 | 2/1955 | Mendez | 261/16 |
| 2,745,727 | 5/1956 | Holzapfel | 123/120X |
| 3,331,214 | 7/1967 | Proctor et al. | 62/52X |

*Primary Examiner*—Kenneth H. Betts
*Assistant Examiner*—Milton L. Smith
*Attorney*—Brufsky and Staas

ABSTRACT: Apparatus and a method for delivering a cryogenic fuel to the power plant of a land vehicle.

PATENTED FEB 23 1971 3,565,201

INVENTORS
ROBERT E. PETSINGER

BY Brufsky and Staas

ATTORNEYS

PATENTED FEB 23 1971 3,565,201

INVENTOR
ROBERT E. PETSINGER

BY Brufsky and Staas
ATTORNEYS

CRYOGENIC FUEL SYSTEM FOR LAND VEHICLE POWER PLANT

BACKGROUND OF THE INVENTION

This invention relates to a fuel system for a land vehicle, and more particularly, to a fuel system in which a cryogenic fluid such as liquified natural gas, is delivered to the power plant of the land vehicle as the prime source of energy for driving the vehicle.

Liquified Natural Gas (hereinafter referred to as LNG) is primarily a liquid methane (approximately 90 percent to 93 percent methane), mixed with nitrogen, ethane, carbon dioxide, and less than 1 percent of propane. LNG when combined with air provides a combustible mixture which is ideal as a source of energy for an internal combustion engine or a gas turbine power plant. Upon combustion with oxygen, only carbon monoxide or carbon dioxide is formed. The carbon in the methane substantially completely oxidizes to a gaseous state.

Land vehicles have been propelled heretofore with gasoline or diesel fuel (kerosene). In the higher paraffin hydrocarbon group, for example, gasoline and kerosene, there is a greater chance of incomplete combustion and residual carbon deposits in the power plant. These fuels thus provide a dense exhaust fume as a byproduct of combustion. For example, the carbon to hydrogen ratio by weight in natural gas is 0.30. The carbon to hydrogen ratio by weight in gasoline is 0.186, showing that there is approximately 60 percent more carbon in gasoline than natural gas.

Therefore, the lower carbon deposits associated with the combustion of LNG provide for reduced maintenance costs in the land vehicle, the necessity of fewer oil changes, a substantially smokeless exhaust, and a tremendous reduction in exhaust pollutants or contaminants admitted to the air.

Methane is a lighter weight fuel than gasoline or kerosene and by storing natural gas in liquid form as LNG, a land vehicle can operate for longer periods on an equivalent sized fuel storage tank. For example, LNG occupies approximately 1/632 of the volume of the material in gaseous state at normal ambient conditions of temperature and pressure.

At ambient conditions, gasoline and kerosene and normal paraffin fuels are in a liquid state. These liquids must be vaporized in the carburetor of an internal combustion engine (sprayed in a jet), whereas LNG when exposed to ambient conditions will inherently vaporize. This reduces the amount of handling equipment necessary to introduce LNG as a fuel into the power plant of the land vehicle, and since the heat in the engine does not have to be used to completely vaporize the fuel, the chances of preflame auto ignition, considered to be one of the principal causes of engine "knock" is completely eliminated.

SUMMARY OF THE INVENTION

The present invention relates to the use of LNG or any combustible cryogenic material as a source of fuel for a land vehicle. A fuel system is disclosed in which the cryogenic combustible fluid is stored in liquid form in the land vehicle and fed through a fuel line to a combination two-stage vaporizer and regulator, wherein the cryogenic fluid in liquid form is exposed to ambient temperature and pressure conditions, vaporized, mixed with the air, and fed into the power plant of the land vehicle.

Other advantages of the invention will become apparent from the following description and claims and from the accompanying drawing wherein:

DESCRIPTION OF THE PREFERRED EMBODIMENT

Figure 1:
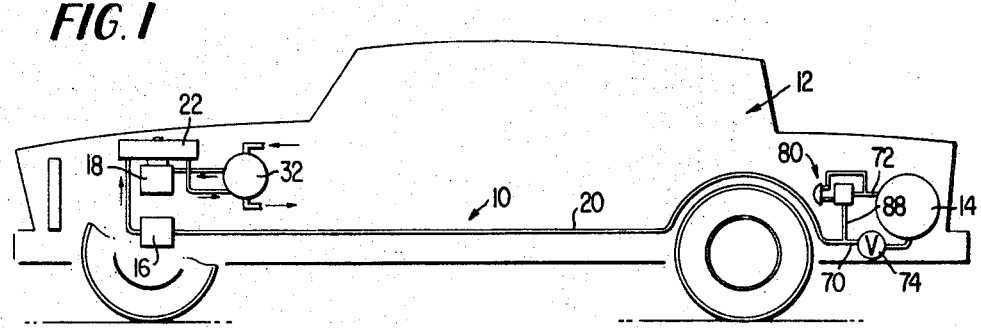
FIG. 1 is a schematic diagram of a cryogenic fuel system for a land vehicle.
Figure 2:
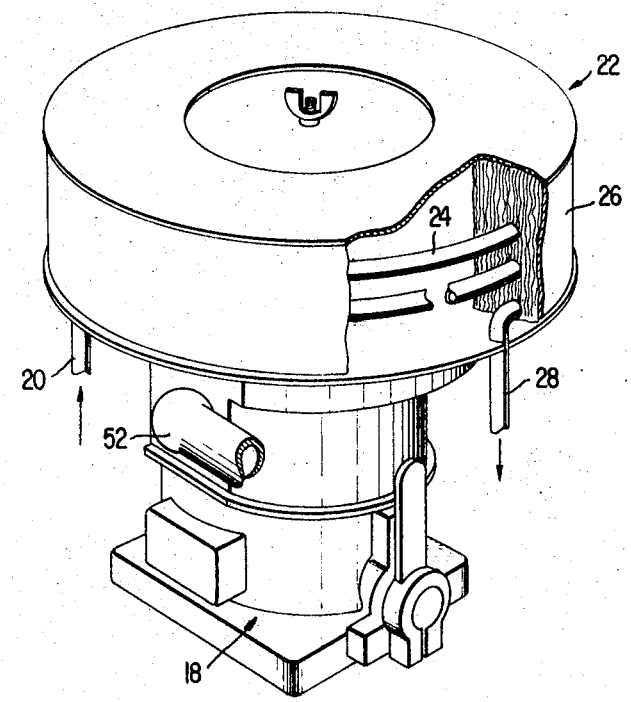
FIG. 2 is a perspective view, partly broken away, of a first stage vaporizer and carburetor combination used in the fuel system illustrated in FIG. 1.
Figure 3:
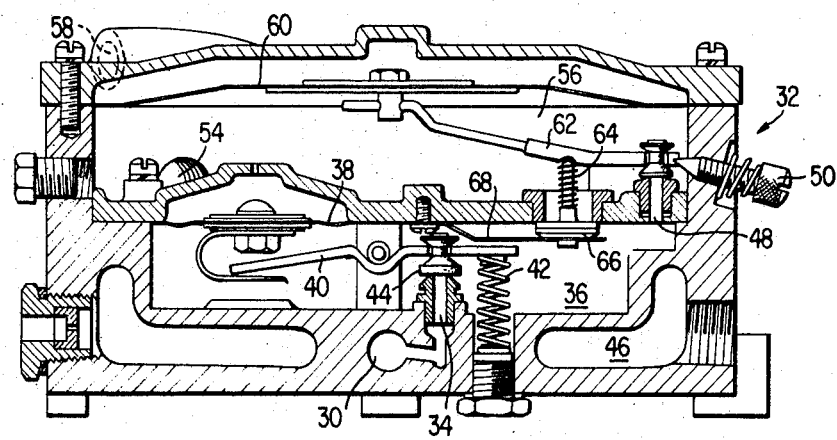
FIG. 3 is a longitudinal cross-sectional view of a second stage vaporizer and regulator unit used in the fuel system shown in FIG. 1.

Referring now to the drawings in detail, wherein like numerals indicate like elements throughout the several views, FIG. 1 illustrates a schematic fuel system 10 for use with a land vehicle generally designated by the numeral 12. LNG or an equivalent cryogenic combustible liquid, such as methane, hydrogen, ethane or ethylene, is stored in a specially constructed insulated tank 14 housed in the trunk of the vehicle 12. The storage tank 14 could be placed in any other convenient location that would have room for the vessel, depending upon the shape or type of vehicle, for example bus, truck, taxicab, etc. Tank 14 is an insulated structure which maintains the cryogenic fluid in liquid form.

Upon actuation of a solenoid valve 16 by turning a switch in the driver's compartment by use of a key, the difference in pressure existing at carburetor 18 and at fuel tank 14 will enable the LNG or cryogenic liquid to flow through a fuel line 20 to a first stage vaporizer unit generally designated by the numeral 22.

First stage vaporizer 22 consists of a plurality of copper, stainless steel, or aluminum tubes 24, or other materials compatible with cryogenic temperatures, imbedded in an air filter 26. The cryogenic liquid flows through fuel line 20 into tubing 24 and is vaporized by being exposed to ambient air flowing through the air filter structure 26.

LNG is a material which will vaporize or change from a liquid to gaseous state at approximately $-259°$ F. and will be in heat-exchange relation with the ambient air surrounding the first-stage vaporizer unit 22, which ambient conditions cause the LNG to vaporize. The other combustible cryogenic liquids mentioned heretofore will also pass from a liquid to vapor state when exposed to ambient temperature and pressure. For example, hydrogen will change to a vapor at $-423°$ F, ethane at $-128°$ F. and ethylene at $-155°$ F. Therefore, regardless of the outside temperature surrounding land vehicle, vaporization will occur even on the coldest days.

Usually, the LNG or other cryogenic fuel will flow rapidly through the tubing or coils 24. The rate of flow will depend upon speed of the vehicle and the suction present at the carburetor unit 18. Accordingly, vaporization in unit 22 may be incomplete. In order to insure complete vaporization of the LNG or cryogenic fuel, an outlet line 28 from the first stage vaporizer unit 22 is connected to the inlet opening 30 of a second stage vaporizer and regulating unit generally designated by the numeral 32.

Mixed liquid and vapor enters inlet 30 and passes through a primary orifice 34 into a primary regulating and vaporizing area 36, where pressure is reduced from tank pressure down to between 5 and 6 p.s.i. maximum. This pressure reduction is achieved through action of fuel pressure against a primary diaphragm 38, which actuates a primary lever mechanism 40 and overcomes a calibrated spring 42, thus closing a valve 44 to shut off the incoming fuel supply.

After reduction in pressure, expansion and vaporization of the fuel takes place. Water is circulated through a chamber 46 and acts as the heating medium to effect complete vaporization of the fuel. This water may be supplied from the cooling system of the land vehicle. Alternatively, the exhaust system of the vehicle may be tapped and the hot exhaust gases circulated through the second stage vaporizer-regulator unit 32 in heat exchange relation with the completely vaporized LNG or cryogenic fluid.

Vaporized fuel is now ready for delivery to the carburetor 18 according to engine demand. Idle and starting fuel is supplied through a pilot orifice 48 by turning an idle adjustment screw 50.

As the engine speed increases above idle, a vacuum is created at the carburetor venturi and is transmitted through hose 52 connected to outlet 54 of the second stage vaporizer-regulator unit 32 to a chamber 56. Atmospheric pressure exerted through vent hole 58 forces down a secondary diaphragm 60, a secondary lever 62 and compresses a spring 64. A valve 66 remains closed due to a leaf spring 68 and fuel pressure in chamber 36. After the free travel clearance between lever 62 and valve 66 is taken up, any increase in venturi vacuum will force the valve 66 to begin opening, enabling vaporized fuel to continue to flow through outlet 54 into the carburetor venturi through hose 52 in proportion to the air velocity through the carburetor venturi, insuring an ideal mixture at all engine speeds. The second stage vaporizer-regulator unit 32 forms no part of the instant invention but is sold by Beam Products Mfg. Co. under the designation "Beam 400-A." The only 400are to replace various parts which will not withstand cryogenic cold with fluorinated plastic materials which will.

When the fuel from the second vaporizer-regulator unit 32 enters the carburetor unit 18, it is mixed with ambient air in correct proportions and transmitted to the internal combustion power plant of the land vehicle for consumption.

Figure 4:
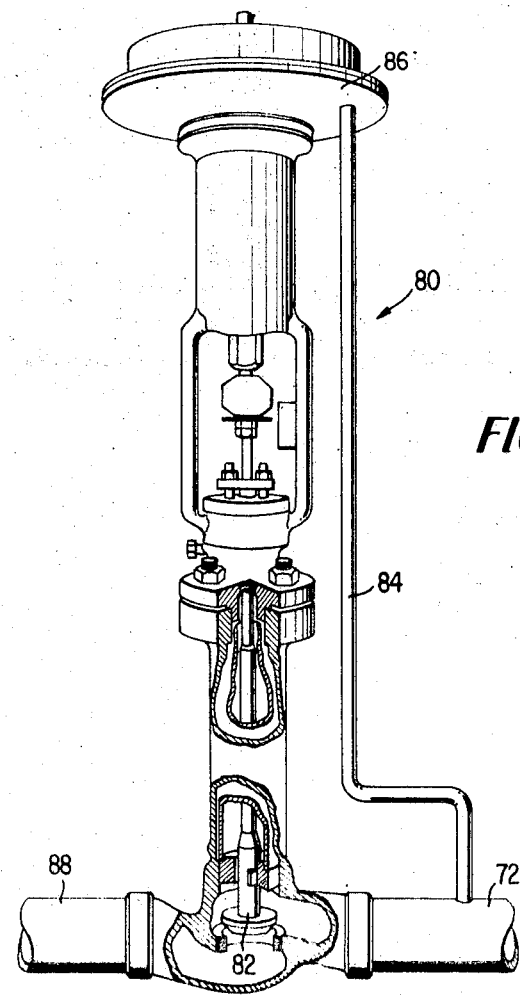
FIG. 4 is a perspective view of a vapor phase flow controller comprising an additional component of the fuel system illustrated in FIG. 1.

Due to the cold of the cryogenic fluid, some of the liquid in tank 14 will normally vaporize. Storage tank 14 has a liquid withdrawal line 70 which is always in contact with the liquid phase of the cryogenic fuel within the tank 14 and a vapor withdrawal line 72 which is always in contact with the vapor phase of the fuel within the tank 14. In the liquid line 70 there is a swing-type check valve 74 which prohibits back flow of liquid into tank 14. In the vapor line 72 there is a vapor phase flow controller generally designated by the numeral 80, and shown in more detail in FIG. 4. Vapor phase flow controller 80 is essentially a valve 82 controlled by the vapor pressure in line 72 so that if the pressure exceeds the set point, vapor will be transmitted through a line 84 to the head 86 of the vapor phase controller 80 to contact a diaphragm which causes valve 82 to be raised to open, enabling excess vapor in line 72 to flow through a line 88 into fuel line 20 to prevent build up pressure in tank 14. If the vapor pressure in tank 14 is lower than the set point by a specified pressure, it will remain closed. In between the two extremes, the valve will throttle. The vapor phase flow controller 80 is also a standard structure and is sold by The Fisher Governor Company of Marshalltown, Iowa.

Since the cryogenic gas does not act as a solvent typically, it will not remove oil from the cylinder walls and will further leave spark plugs carbon free for better performance and longer life. Smoother combustion performance results since the cryogenic fluid is completely vaporized when it reaches the carburetor. Furthermore, the cold available in the vaporization process can be used for air conditioning and/or as an additional coolant for the engine or the exhaust.

While a fuel system for a land vehicle has been disclosed, the necessity for vaporization of the cryogenic fluid presents an ideal situation wherein energy can be tapped from the system for additional applications. For example, when the LNG vaporizes, the heat exchange medium to cause vaporization of the LNG is cooled. The cooled medium may be used for refrigeration purposes, such as air conditioning. Alternatively, the vaporized fuel may be tapped for other power applications.

For example, a street sweeper may have a power plant such as an internal combustion engine run on LNG fuel. A large percentage of the materials picked up by street sweepers are combustible products such as wood, leaves, wastepaper and other litter. Combustion of this material in the gathering chamber can effectively reduce the volume of litter to ashes plus the combustion gases which are discharged. LNG vapor may be tapped from the vapor entering the power plant of the vehicle and conducted to a vapor burner located in the gathering chamber of the sweeper.

Similarly, a refuse truck provided with an internal combustion engine power plant powered by LNG fuel could have its vaporized LNG or even liquid LNG tapped and then vaporized to burn refuse material completely. Typically, this would be done in a two or three stage combustion chamber with LNG vapors entering all three of these combustion chambers. With the proper pressure system and compression, a partial oxidation of the refuse material, if it has a high garbage content, can be established to generate a soil additive, material that is high in nitrogen and has some fertilizer value. Three chambers would provide the maximum amount of assurance of elimination of odors from the exhaust as well as complete combustion of all flammable material. The first chamber with all particulate matter in the garbage and refuse would be the largest chamber, heating all of the materials. The second chamber would be provided for vapor of LNG and air as well as the combustion products of the first chamber. The third chamber would be a repetition of the second chamber except it would also have between the second and third chamber a cooling coil for the purpose of condensing as much water as possible from the combustion chamber of the first and second stages. This hopefully would also absorb any odors left in the system prior to the third combustion chamber.

Alternatively, the pressure system for making compost would use a fired pressure vessel into which the refuse had been inserted and where it would be allowed to cook for given periods of time. After a given period of time the cooked compost would be discharged into the second chamber with the presorted noncombustible, and the remaining vapors left in the pressure compartment being fired directly for removal of odors prior to the separate discharge. The compost would then be delivered to a packaging operation for distribution as a fertilizer material.

If the power plant is located in an LNG fueled farm type tractor the refrigeration energy available from the LNG can be used for vegetable or fruit chilling or field chilling of the crops as they are harvested. Furthermore, the tractor can be modified so that it is not only powered by LNG but it can also use the liquified natural gas in vaporized form directly for flame cultivation of specific crops.

A brush clipper is utilized for tree harvesting and cleaning areas of tree farming. The brush clipper can be operated by an internal combustion engine whose energy source is an LNG tank and a system as disclosed in this patent application. The system would be portable and could have its own LNG tank or be accessible to a centralized fueling and service facility. The LNG powered brush clipper could be used for burning small limbs or brush as trees are harvested. Remote field locations can also use LNG for burning scrap wood.

Similar portable applications are envisioned by using the fuel system of the present invention. For example, a portable internal combustion engine could be powered by the system to drive an irrigation pump or air compressor.

An internal combustion engine powered by a fuel system as disclosed herein can also be used to drive an electric motor for electrical power generation or for that matter, the fuel system can be easily modified to drive or to power a gas turbine for generation of electricity. In the latter case, the turbine would be connected directly to the second stage vaporizer-regulator unit. The turbine could even be used to power the land vehicle itself, where electrical generation was not necessary. Furthermore, the refrigeration effect byproduct of vaporizing the LNG could be used to cool the very hot exhaust gases produced by the turbine prior to their release to the atmosphere.

It will be obvious that complete systems for land vehicles, watercraft and aircraft could be provided using LNG as a fuel source for the vehicle. For example, trains can be powered by the LNG fuel system of the invention, while providing a source of air conditioning, fuel for cooking, etc.

I claim:

1. The method of supplying cryogenic vapor in admixture with ambient air as fuel for operating the power plant of a land vehicle, said method comprising the steps of:

providing a reservoir of combustible cryogenic fluid within a controlled pressurized container carried by said land vehicle;

conveying said cryogenic fluid in substantially liquid state from said container towards the power plant of said vehicle;

vaporizing said cryogenic fluid adjacent the power plant of said vehicle by placing it in heat exchange relation with ambient air, further vaporizing any residual cryogenic liquid in said cryogenic fluid adjacent said power plant while simultaneously raising the temperature of the cryogenic vapors previously generated by said first vaporization step by placing said cryogenic fluid in heat exchange relation with a fluid other than said ambient air; and introducing the resultant heated cryogenic fluid in substantially vapor state into the power plant of said land vehicle in admixture and regulated proportion with said ambient air in heat exchange relationship with the cryogenic fluid during said initial vaporization step.

2. A method in accordance with claim 1 wherein said combustible cryogenic liquid is LNG.

3. A method in accordance with claim 1 wherein said other fluid is water used to cool said power plant.

4. A method in accordance with claim 1 wherein said other fluid is the exhaust gases evolved by said power plant.